United States Patent [19]

Wojcik et al.

[11] Patent Number: 4,596,899
[45] Date of Patent: Jun. 24, 1986

[54] TELEPHONE HEARING AID

[75] Inventors: Jacek J. Wojcik, Nepean; Andrzej Przybysz; Peter R. Milton, both of Ottawa, all of Canada

[73] Assignee: Northern Telecom Limited, Montreal, Canada

[21] Appl. No.: 650,271

[22] Filed: Sep. 14, 1984

[30] Foreign Application Priority Data

Aug. 2, 1984 [CA] Canada .................................. 460288

[51] Int. Cl.⁴ .................................. H04M 1/60
[52] U.S. Cl. .................................. 179/2 C; 179/81 B
[58] Field of Search ...... 179/2 C, 81 B, 107 R–107 S, 179/82; 381/68, 69

[56] References Cited

U.S. PATENT DOCUMENTS

| T880003 | 11/1970 | Spahn | 179/2 C |
| 2,544,027 | 3/1951 | King | 179/81 B |
| 2,554,834 | 5/1951 | Lavery | 179/81 B X |
| 2,847,506 | 8/1958 | Gray et al. | 179/2 C |
| 3,301,955 | 1/1967 | Clements, Jr. | 179/81 B X |
| 4,442,318 | 4/1984 | Desrochers | 179/2 C |

FOREIGN PATENT DOCUMENTS 3012393 10/1981 Fed. Rep. of Germany ...... 179/2 C

Primary Examiner—Keith E. George
Attorney, Agent, or Firm—Stuart L. Wilkinson

[57] ABSTRACT

A portable telephone hearing aid having an acousto-acoustic/magnetic amplifier providing a maximum gain of 20 dB has a circular housing at one end of a U-shaped resilient clip member for attaching it to the telephone receiver in a handset. A battery compartment, also housing an ON/OFF switch, and a gain control wheel, is located at the other end of the U-shaped clip.

12 Claims, 4 Drawing Figures

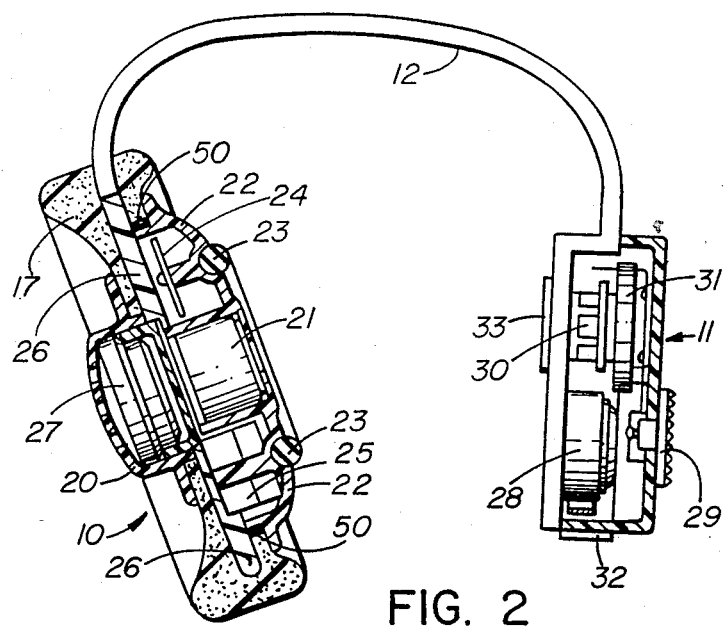
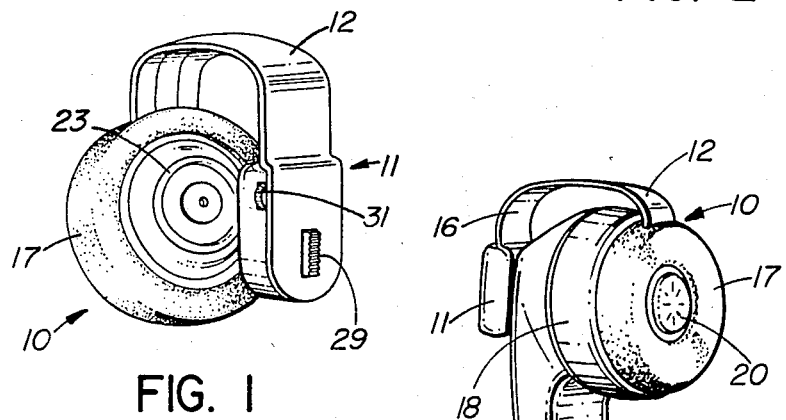
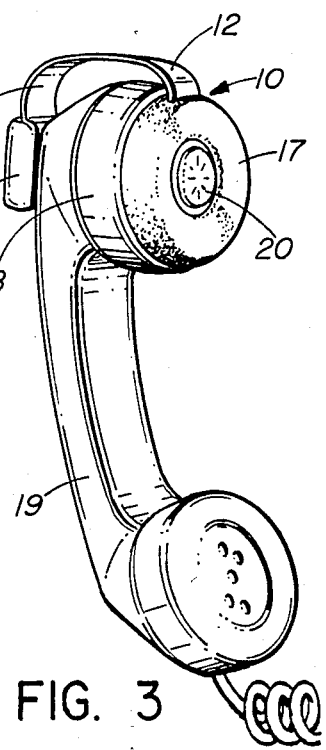
FIG. 2
FIG. 1
FIG. 3

TELEPHONE HEARING AID

FIELD OF THE INVENTION

This invention relates to hearing aids for the hard of hearing on the one hand, and on the other hand it relates to telephones. More specifically, it relates to hearing aids for telephone receivers. More specifically still, it relates to a fully portable hearing aid that may be used in conjunction with almost any receiver in telephone handsets by the hard of hearing, or by those in noisy environments. Furthermore, the acousto-acoustic/magnetic amplifier provided by the invention is useful to energize a hearing aid worn by a person acoustically or magnetically.

BACKGROUND OF THE INVENTION

Universal access to telephone services has become a recognized necessity in society. It is regarded as an essential service for the elderly in particular. Those members of society who have had to contend with a hearing impairment, whether by reason of age or otherwise, had less than fully satisfactory access to telephone services. Unless the telephone handset had a built-in amplifier, depending on the degree of hearing impairment they often could not use it.

In the United States it is estimated that over sixteen million people are hearing impaired, seven million of whom are over sixty five years of age.

Although there is no agreed on international standard of classification, a practical guide to hearing impairment is found in the following four categories.

(1) Moderate precipitous Impaired: Have mild threshold loss between 0 and 25 dB at low frequencies from 250 Hz to 1 kHz with a precipitous drop of hearing loss from 2 kHz to above 4 kHz with a slope usually not less than 25 dB/octave.

(2) Moderate Gradual Impaired: Have threshold loss between 10 and 40 dB at 250 Hz with a gradual slope of 10 to 20 dB/octave to about 4 kHz.

(3) Severely Impaired: Have threshold loss of between 40 and 85 dB in the frequency range up to 4 kHz with no threshold differences higher than 15 dB between any two frequency octaves within that range.

(4) Other Impaired: Have threshold loss, usually selective by frequency, which does not come within any of the above categories.

The most common condition in which a hearing aid may be required is that condition known as "sensorineural" hearing loss. It results from damage to the nerve centres in the inner ear, the nerve pathways to the brain, or possibly that portion of the brain that receives and interprets audio signals. It is characterized by the inability to hear sound in specific frequency regions or in a whole audible frequency range, which may lead to difficulty in understanding sounds present in normal speech. This inability is detected as, for instance, a shift (upward) of hearing threshold. It is also accompanied by change of dynamics in speech perception. Accordingly, this condition is alleviated by hearing aids the frequency responses of which are tailored to the impairment characteristics of the individual user.

The function of a telephone hearing aid would normally be to couple its output, acoustic and/or magnetic, to the hearing aid worn by the user, who places the handset to his head in the usual fashion. Since the worn hearing aid compensates for the unique impairment of the individual, a telephone hearing aid should yield a uniform frequency response with some gain. The telephone handset itself, however, only gives the proper acoustic output when properly loaded, i.e. when proper sealed coupling exists between the receiver cap and the pinna of the ear. Thus, "loose" coupling of the telephone receiver to a hearing aid impairs the standard characteristic response of the receiver. This is generally speaking often the case, even with so-called in-the-ear hearing aids, which are often not sufficiently in the ear to allow a good seal between receiver cup and pinna.

Apart from acoustic coupling, some hearing aids have magnetic pick-up capability, which either responds to the magnetic field inevitably generated by most telephone receivers or to magnetic field generated by an auxiliary coil built into the handset for that purpose alone. The worn hearing aid may then, if it is so equipped, be switched to a "telecoil" position, where in most cases its acoustic input is disabled. There seems to be evidence, however, that even with magnetic coupling it is desirable to have an acoustic signal directly transmitted through the ear mold of a hearing aid, even when the mold somewhat occludes the ear canal, to improve comprehension.

As may be gleaned from the above discussion the problem is somewhat complex. The problem is compounded by lack of qualified analyses of the parameters involved, subjective as well as objective. Lack of uniformity of hearing aid design also causes inconvenience. A brief exposition of hearing aid types in common usage is in order to facilitate understanding objects and features of the present invention.

It is now in order to discuss the technology of hearing aids proper. The hearing aid is an electro-acoustic device detecting sound from the environment, amplifying this sound and finally delivering this amplified sound to the ear. Conventional hearing aids are classified in power categories by amplification, such as: very strong, 65 dB or more; strong, 56–64 dB; moderate, 46–55 dB; mild, 31–45 dB; and very mild, less than 30 dB. There is no agreement on correctness of classification by gain. Consideration of frequency characteristics leads to another classification, such as: wide band; high frequency hearing aids; etc. There are four common hearing aids available on the market when classified by their construction. The smallest and most inconspicuous is worn completely in the ear ("in-the-ear" type). It provides limited amplification and is best suited to people who have only a mild hearing impairment. The largest and most powerful aid is worn on the body with only the receiver extending to the ear ("body" type). This type of aid is generally used in cases of extreme hearing loss and often by children needing robust, reliable devices. The largest number of hearing aids in use are light weight hearing aids worn on the side of the head. There are two types available today; one is the "behind-the-ear" aid (the familiar half moon shaped instrument), and the other is an "eyeglass" aid. In both of these models the earphone (receiver) is located in the hearing aid body and sound is directed to the ear canal with tubing terminated with an ear mold.

A hearing aid consists of four basic components; microphone, amplifier, receiver and battery. Each of these components has to be selected or designed to interact with each of the other sections for optimal performance of the hearing aid.

The input transducer or microphone converts acoustic sound pressure into an electrical signal. The microphone is important in determining several performance characteristics of the hearing aid. Among these are frequency response, signal to noise ratio, acoustic sensitivity threshold, linearity, dynamic range, directionality, etc. Before the 1970's the magnetic and crystal microphones were the standards of the industry. The electret condenser microphone has resulted in the development of hearing aids smaller in size with better performance and reliability than was previously possible.

The electret microphone offers a much broader frequency range than the magnetic or piezo-electric type. The size and weight of the moving system in an electret microphone (light diaphragm only) allows designers to achieve better dynamic range (signal to noise and signal to vibration ratios).

Besides the microphone, there are several alternative input transducers by which the signal can be provided to a hearing aid amplifier: a telecoil; infrared detectors; RF receivers; and direct electrical input. The telecoil was introduced as a solution to overcome high background noise in schools, concert halls, churches, etc., in conjunction with a magnetic loop, where the sound source was far away from the hearing aid microphone. This was especially important with early, poor quality microphones, where a distorted electrical signal was already strongly masked with noise generated by hearing aid vibrations and friction of clothing etc., against hearing aid housing. Permanently installed magnetic loops in conjunction with the telecoil permitted extension of both the frequency spectrum and dynamic range of hearing aids. Electro-magnetic interference, portability and cost were major factors limiting the popularity of magnetic loop systems. The two first drawbacks are often overcome by the use of special wireless hearing aids working with infrared or radio transmitters. However, complexity of a wireless input stage makes hearing aids operating on these principles bulky and expensive.

The popularity of the telecoil as a marketable feature and the limited availability of permanent magnetic loops stimulated other applications of the telecoil such as the use with small magnetic sources (coils for television and radio or telephones and recently with portable room loops or neck loops). Different characteristics of various magnetic sources lead to a variety of telecoils having different sensitivity, frequency characteristics or orientation.

The hearing aid with telecoil and/or electrical input would always have a microphone built in. A switch (often called the "T" switch) permits choice of the input depending on what mode of operation is judged by user to be the best in given circumstances. However, the basic input device, a microphone, is not built into a wireless hearing aid. Therefore, a wireless hearing aid's use is limited to special applications only.

The amplifier boosts the level of electrical output of the microphone or alternative input stage. The amplifier must provide high gain, low noise, and good electrical dynamic range. In the early 70's the advent of the integrated circuit profoundly affected the hearing aid. The integrated circuits used in hearing aids provide amplification and permit addition of other functions required of the amplifiers: frequency corrections, automatic gain control, etc. while still providing long battery life. The amplified electrical signal is delivered to an output transducer.

The output transducer or receiver converts the electrical output of the amplifier to sound pressure. The receiver is the most critical component of the hearing aid design. In most designs, the receiver determines the final output, overall acoustic gain, frequency response and dynamic range of the hearing aid. All hearing aid receivers manufactured today are of the magnetic type. The receiver is terminated with an ear mold which either occludes the ear canal or simply maintains the terminating receiver tube in its proper position. The ear mold is not only the most uncomfortable part of the hearing aid, but can also degrade the quality of the hearing aid and its performance. An alternative to a receiver as an output transducer is a bone vibrator transmitting sound directly to the mastoid.

Some wireless hearing aids will have the output transducer substituted with a magnetic loop placed around the user's neck. This means that a hearing aid such as a behind-the-ear type does not have to be removed, but can be used in its telecoil position to pick up signals produced by the neck loop. In spite of the inconvenience of using two devices, this hardware configuration is gaining increasing application because of its efficiency.

The power source of the hearing aid is a battery. The hearing aid compartment must be opened in order to change batteries, thus allowing dirt and moisture into the instrument, and increasing the chance of mechanical problems. Rechargeable batteries have limited capacity and are used mostly in large hearing aids. However, they make it possible to design a sealed hearing aid. Voltage available from the battery is related to its physical size and often limits the linear amplification capability of the hearing aid.

Comprehensive evaluation of hearing aid performance involves some thirty factors. But the most important parameters are frequency response, acoustic gain and saturated output level. For a telephone hearing aid, however, such as the one contemplated by this invention, these parameters do not represent an important challenge.

SUMMARY OF THE INVENTION

The primary objective of the present invention is to provide an intermediate acousto-acoustic amplifier between a telephone receiver and the individual's worn hearing aid.

A secondary objective is to provide an acousto-acoustic amplifier for telephone users in noisy environments.

A further objective is to provide acousto-magnetic amplification and output in addition to the acoustic output, so that hearing aids with telecoil can be energized.

These objectives must be fulfilled with an easy to use, highly portable and light weight, as well as universal (as much as possible) telephone hearing aid.

According to the present invention, a telephone hearing aid is provided, comprising an acousto-acoustic amplifier, having an input and an output, housed in an annular disc-like housing adapted for placement against a telephone receiver in a handset at one side thereof having said input, and adapted at the opposite side thereof, having said output, for placement against a human ear.

By a variant of the present invention, a telephone hearing aid is provided comprising an acousto-magnetic amplifier, having an acoustic input and a magnetic output, housed in an annular disc-like housing, adapted for placement against a telephone receiver in a handset at one side thereof having said acoustic input, and adapted at the opposite side thereof for placement against a magnetic input of a hearing aid worn by a human.

In the preferred embodiment of the present invention, the telephone hearing aid provided comprises an input acousto-electric transducer driving an electronic voice-band amplifier, electro-acoustic driving output and electro-magnetic transducers; a battery compartment adapted to receive a battery to power said electronic amplifier; a housing for the transducers and the electronic amplifier, said housing connected to said battery compartment by a resilient U-shaped flat member adapted to attach said housing to a receiver of a telephone handset such that the acousto-electric transducer on one side of said housing is adjacent the receiver and the electro-acoustic transducer radiates in a direction away from the receiver.

Although the telephone hearing aid of the present invention is primarily intended to benefit the hearing impaired, it is also useful for use in noisy environments, such as machine shops or construction sites, by any person.

An advantage of the telephone hearing aid of the present invention is its portability and ease of attachment. In the preferred embodiment this is achieved by means of a resilient U-shaped clip which fits over the receiver end of the telephone handset. As a result, however, the acousto-acoustic gain of the device must be limited to approximately 20 dB., otherwise the acoustic coupling between input and output would cause instability and audible oscillations. But since a telephone hearing aid is meant for use in conjunction with the user's own hearing aid, indeed that is the only possible mode of use of an only acousto-magnetic device, this is not a significant disadvantage.

BRIEF DESCRIPTION OF THE DRAWINGS

Other features and advantages of the present invention will become apparent when describing the preferred embodiment of the present invention in conjunction with the attached drawings, in which:

FIG. 1 is a perspective drawing of a telephone hearing aid according to the present invention;

FIG. 2 is a cross-section in the central plane bisecting the telephone hearing aid shown in FIG. 1, FIG. 3 shows the telephone hearing aid of FIG. 1 attached to the receiver of a telephone handset.

DETAILED DESCRIPTION OF THE PREFERRED EMBODIMENT

Figure 4:
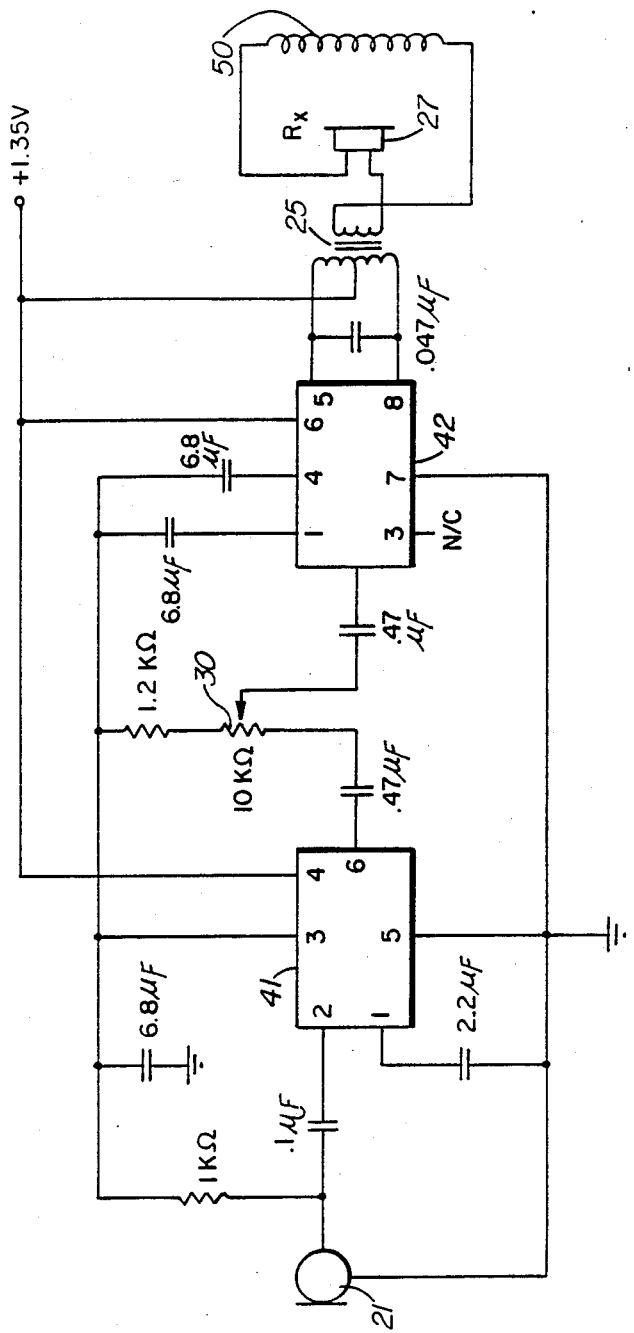
FIG. 4 shows the circuit schematic of the acousto-acoustic/magnetic amplifier of the telephone hearing aid in FIG. 1.

In FIG. 1 of the drawings (together with FIG. 3) a perspective of the telephone hearing aid is shown. It comprises two main ports, a disc-like housing 10 and a battery compartment 11. The housing 10 and the battery compartment 11 are attached to the ends of a resilient U-shaped flat member 12 and the whole asserbly is made preferably of molded plastic. The battery compartment actually contains an ON/OFF switch 29, a volume control 31 and a standard hearing aid battery receptacle (not shown) the battery compartment, which opens outwardly, and the housing 10 is effected by means of a flat cable 16 along the inside surface of the flat member 12. A doughnut shaped (toroidal) sponge cushion 17 surrounds the periphery of the housing 10. The cushion 17 attenuates acoustic coupling between the front and back surfaces of the housing 10 when the device is attached to a receiver 18 of a telephone handset 19 (as shown in FIG. 3), particularly when the front surface of the housing 10, and with it the cushion 17, is pressed against the human ear of the user. Thus the cushion 17 also acts as a soft cushion for the user's ear. The centre part 20 of the front face of the housing 10 protrudes or is somewhat convex in order to fit into the hollow of the user's ear just outside the ear canal. The centre part has a number of apertures or slits so as to communicate the sound pressure generated by the device's own internal electro-acoustic output transducer. The intra-conchal position of the centre port 20 produces in the ear canal a higher sound pressure for a given output power.

Now we turn to FIG. 2 of the drawings, which shows a cross-section in the central plane bisecting the device shown in FIG. 1, but for clarity without hatching the U-shaped member 12. It is perhaps necessary to point out that other views of the device are necessary, since the important housing 10 exhibits rotational symmetry in respect of its shaped components around its main central axis.

In the housing 10, an electret condenser type microphone 21 (not shown in cross-section) faces with its active surface the inside of the U-shaped member 12. The housing 10 portion 22 within which the microphone 21 is positioned is in the shape of a flattened or truncated dome, the flat portion of which is circumscribed at the outside surface by a glued on O-ring 23, which serves to seal the sound emanating from the receiver 18 when it abuts the normally concave outside surface of the receiver 18. An electrical printed circuit board 24 which supports an electronic voice-band amplifier (in FIG. 4) as well as a voice-band transformer 25 are positioned in the hollow space created by domed shape portion 22 of the housing 10 surrounding the microphone 21. The U-shaped member 12 as it connects with the housing 10 expands into a flat disc 26 which separates the housing 10 into two parts, the microphone part and an electro-acoustic transducer 27 (not shown in cross-section) part. The flat disc 26 also supports the sponge cushion 17, which frames the disc 26 and covers most of the housing 10 except at the centres on either side. The sponge cushion 17 is made of a soft, closed cell sound absorbent material.

In addition to the electro-acoustic transducer 27, the device also has an electro-magnetic transducer, being a cylindrical wire coil 50, which produces a magnetic field perpendicular to its plane substantially along the symmetry axis of the housing 10.

At the other end of the U-shaped member 12 is the battery compartment 11. It houses, in addition to a battery 28, an ON/OFF switch 29 and a potentiometer 30 with its adjustment wheel 31 protruding slightly from the side of the compartment 11. For the sake of clarity, the components shown in the battery compartment 11 are not shown in cross-section. The battery 28 is placed in a standard hearing aid type receptacle, which is hinged and opens outwardly by means of a small grip 32.

Finally, a rubber or soft-plastic disc 33 is glued to the inside surface of the compartment 11 in order to better grip the back surface of the telephone handset 19.

FIG. 4 shows the electronic circuit schematic of the voice-band amplifier, which is mounted on the printed circuit board 24. It is designed to draw a minimal current of 0.75 mA from the battery 28, a 1.35 Volt standard hearing aid cell, without input signal, i.e. without sound pressure being present. The amplifier draws a current of 10 mA at maximum output signal. With such consumption, the battery 28 life is on average 3 weeks with average telephone use. The amplifier utilizes two integrated circuits 41 and 42 in tandem. The potentiometer 30 taps the output of the input integrated circuit 41 to adjust the gain of the amplifier. The microphone 21 is capacitively coupled to the input of the integrated circuit 41, while the transformer 25 is d.c.-coupled to the output of the integrated circuit 42. The secondary of the transformer 25 drives in series, both the electro-acoustic transducer 27 (the receiver of the device) and the electro-magnetic transducer, i.e. the cylindrical coil 50, which comprises 10 to 12 turns. The transformer 25 could also drive the transducer 27 and the coil 50 in parallel, but then the number of turns of the coil 50 would have to be redesigned.

The integrated circuits 41 and 42 are available from Linear Technology Inc., Burlington, Ontario, Canada as part numbers LC506 and LC549, respectively. They provide an acoustical and magnetic gain of 20 dB in the telephone voice-band of 350 Hz to 3500 Hz. A suitable battery is a Mallory type RM 675. Of course, other standard hearing aid components may be used instead. With such suitable components and a light weight plastic compound for the housing 10, the compartment 11 and the U-shaped member 12, the whole device weighs in the vicinity of 25 gramme. The housing 10 diameter is 5 cm with the cushion 17 in place. Its thickness at the centre is approximately 1.5 cm. The battery compartment 11 measures approximately $3 \times 1.7 \times 1.2$ cm.

As will be realized quickly by the users of the telephone hearing aid, it can be installed over the receiver 18 and operated with one hand. It may be left mounted on the handset 19 and will operate the hook switch of most telephone sets available.

What is claimed is:

1. A telephone hearing aid for attachment to a telephone handset, the hearing aid having a disc shaped circular symmetric housing for an acousto-electric input transducer, an amplifier, a transformer having a primary winding connected in series with the input transducer and a secondary winding series connected to both an electro-acoustic output transducer and an electro-magnetic output transducer, said transducers being circular symmetric and concentrically located on the axis of the housing, said housing having a domed rear face adapted to fit into a dished face of the telephone handset receiver, and a resilient curved band extending from the housing and terminating at a self contained power source, said band enabling spring mounting of the telephone hearing aid onto a telephone handset with the telephone handset receiver gripped between said housing and said power source.

2. The telephone hearing aid as defined in claim 1, said amplifier comprising an electronic voice-band amplifier having an output driving both said electro-acoustic transducer and said electro-magnetic transducer.

3. The telephone hearing aid as defined in claim 1, said housing having an annular sound absorbent cushion surrounding its periphery for attenuating sound between the input and the output when the telephone handset receiver is pressed against a human ear.

4. The telephone hearing aid as defined in claim 1, wherein the input transducer comprises an electret microphone.

5. The telephone hearing aid as defined in claim 1, in which the eletro-magnetic output transducer comprises a cylindrical magnetic-field producing coil within said housing, said coil having its cylindrical axis substantially perpendicular to the telephone handset receiver.

6. A telephone hearing aid as claimed in claim 1 said self contained power source comprising a battery compartment adapted to receive a battery to power said amplifier, said housing connected to said battery compartment by said resilient curved band; and wherein the acoustic-electric transducer on one side of said housing faces the telephone handset receiver and the electro-acoustic transducer is on the opposed side of said housing and radiates in a direction away from the telephone handset receiver.

7. The telephone hearing aid as defined in claim 6, said electronic voice-band amplifier comprising a potentiometer for adjusting its electrical gain by a user of said telephone hearing aid.

8. The telephone hearing aid as defined in claim 7, said acousto-electric transducer being an electret microphone, and said electro-acoustic transducer being a hearing aid-type receiver.

9. The telephone hearing aid as defined in claim 8, said electro-magnetic transducer being a cylindrical magnetic-field producing coil within said housing.

10. The telephone hearing aid as defined in claim 9, said coil having its cylinder axis substantially perpendicular to the receiver when said housing is in place.

11. The telephone hearing aid as defined in claim 10, said housing having an annular sound absorbent cushion surrounding its periphery for attenuating sound between the input and the output particularly when pressed against a human ear.

12. The telephone hearing aid as defined in claim 11, said housing having an input aperture in said one side surrounded by a sound attenuating O-ring when contiguous said telephone receiver.

* * * * *